United States Patent
Langridge

(10) Patent No.: US 8,497,838 B2
(45) Date of Patent: Jul. 30, 2013

(54) PUSH ACTUATION OF INTERFACE CONTROLS

(75) Inventor: Adam Jethro Langridge, Guildford (GB)

(73) Assignee: Microsoft Corporation, Redmond, WA (US)

( * ) Notice: Subject to any disclaimer, the term of this patent is extended or adjusted under 35 U.S.C. 154(b) by 351 days.

(21) Appl. No.: 13/028,970

(22) Filed: Feb. 16, 2011

(65) Prior Publication Data

US 2012/0206345 A1   Aug. 16, 2012

(51) Int. Cl.
*G06F 3/033* (2006.01)

(52) U.S. Cl.
USPC ........... 345/157; 345/158; 345/160; 345/161; 345/162; 345/163; 345/164; 345/165; 345/166; 63/6; 63/7; 63/8; 63/30; 63/31; 463/1; 463/8; 463/30; 463/42; 463/50; 463/69; 710/1; 710/74; 715/856; 715/862

(58) Field of Classification Search
USPC .................. 345/157–167, 173–184; 463/1–8, 463/60–42, 50–69; 710/1–74; 715/856–862
See application file for complete search history.

(56) References Cited

U.S. PATENT DOCUMENTS

| | | |
|---|---|---|
| 4,627,620 A | 12/1986 | Yang |
| 4,630,910 A | 12/1986 | Ross et al. |
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |

(Continued)

FOREIGN PATENT DOCUMENTS

| | | |
|---|---|---|
| CN | 201254344 B | 6/2010 |
| EP | 0583061 A2 | 2/1994 |

(Continued)

OTHER PUBLICATIONS

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

(Continued)

*Primary Examiner* — Amare Mengistu
*Assistant Examiner* — Vinh Lam
(74) *Attorney, Agent, or Firm* — Alleman Hall McCoy Russell & Tuttle LLP

(57) ABSTRACT

A computing system translates a world space position of a hand of a human target to a screen space cursor position of a user interface. When the cursor overlaps a button in the user interface, the computing system actuates the button in response to a movement of the hand in world space that changes the cursor position by a depth threshold along a z-axis regardless of an initial z-axis position of the cursor. When the button includes an activation lock, the computing system unlocks the activation lock, prior to button actuation, if the cursor path satisfies unlocking criteria.

20 Claims, 6 Drawing Sheets

U.S. PATENT DOCUMENTS

| | | | |
|---|---|---|---|
| 4,893,183 A | 1/1990 | Nayar | |
| 4,901,362 A | 2/1990 | Terzian | |
| 4,925,189 A | 5/1990 | Braeunig | |
| 5,101,444 A | 3/1992 | Wilson et al. | |
| 5,148,154 A * | 9/1992 | MacKay et al. | 715/782 |
| 5,184,295 A | 2/1993 | Mann | |
| 5,229,754 A | 7/1993 | Aoki et al. | |
| 5,229,756 A | 7/1993 | Kosugi et al. | |
| 5,239,463 A | 8/1993 | Blair et al. | |
| 5,239,464 A | 8/1993 | Blair et al. | |
| 5,288,078 A | 2/1994 | Capper et al. | |
| 5,295,491 A | 3/1994 | Gevins | |
| 5,320,538 A | 6/1994 | Baum | |
| 5,347,306 A | 9/1994 | Nitta | |
| 5,385,519 A | 1/1995 | Hsu et al. | |
| 5,405,152 A | 4/1995 | Katanics et al. | |
| 5,417,210 A | 5/1995 | Funda et al. | |
| 5,423,554 A | 6/1995 | Davis | |
| 5,454,043 A | 9/1995 | Freeman | |
| 5,469,740 A | 11/1995 | French et al. | |
| 5,495,576 A | 2/1996 | Ritchey | |
| 5,516,105 A | 5/1996 | Eisenbrey et al. | |
| 5,524,637 A | 6/1996 | Erickson et al. | |
| 5,534,917 A | 7/1996 | MacDougall | |
| 5,563,988 A | 10/1996 | Maes et al. | |
| 5,577,981 A | 11/1996 | Jarvik | |
| 5,580,249 A | 12/1996 | Jacobsen et al. | |
| 5,594,469 A | 1/1997 | Freeman et al. | |
| 5,597,309 A | 1/1997 | Riess | |
| 5,616,078 A | 4/1997 | Oh | |
| 5,617,312 A | 4/1997 | Iura et al. | |
| 5,638,300 A * | 6/1997 | Johnson | 702/153 |
| 5,641,288 A | 6/1997 | Zaenglein | |
| 5,682,196 A | 10/1997 | Freeman | |
| 5,682,229 A | 10/1997 | Wangler | |
| 5,690,582 A | 11/1997 | Ulrich et al. | |
| 5,703,367 A | 12/1997 | Hashimoto et al. | |
| 5,704,837 A | 1/1998 | Iwasaki et al. | |
| 5,715,834 A | 2/1998 | Bergamasco et al. | |
| 5,875,108 A | 2/1999 | Hoffberg et al. | |
| 5,877,803 A | 3/1999 | Wee et al. | |
| 5,913,727 A | 6/1999 | Ahdoot | |
| 5,933,125 A | 8/1999 | Fernie | |
| 5,980,256 A | 11/1999 | Carmein | |
| 5,989,157 A | 11/1999 | Walton | |
| 5,995,649 A | 11/1999 | Marugame | |
| 6,005,548 A | 12/1999 | Latypov et al. | |
| 6,009,210 A | 12/1999 | Kang | |
| 6,054,991 A | 4/2000 | Crane et al. | |
| 6,066,075 A | 5/2000 | Poulton | |
| 6,072,494 A | 6/2000 | Nguyen | |
| 6,073,489 A | 6/2000 | French et al. | |
| 6,077,201 A | 6/2000 | Cheng et al. | |
| 6,098,458 A | 8/2000 | French et al. | |
| 6,100,896 A | 8/2000 | Strohecker et al. | |
| 6,101,289 A | 8/2000 | Kellner | |
| 6,128,003 A | 10/2000 | Smith et al. | |
| 6,130,677 A | 10/2000 | Kunz | |
| 6,141,463 A | 10/2000 | Covell et al. | |
| 6,147,678 A * | 11/2000 | Kumar et al. | 345/158 |
| 6,152,856 A | 11/2000 | Studor et al. | |
| 6,159,100 A | 12/2000 | Smith | |
| 6,173,066 B1 | 1/2001 | Peurach et al. | |
| 6,181,343 B1 | 1/2001 | Lyons | |
| 6,188,777 B1 | 2/2001 | Darrell et al. | |
| 6,215,890 B1 | 4/2001 | Matsuo et al. | |
| 6,215,898 B1 | 4/2001 | Woodfill et al. | |
| 6,226,396 B1 | 5/2001 | Marugame | |
| 6,229,913 B1 | 5/2001 | Nayar et al. | |
| 6,256,033 B1 | 7/2001 | Nguyen | |
| 6,256,400 B1 | 7/2001 | Takata et al. | |
| 6,283,860 B1 | 9/2001 | Lyons et al. | |
| 6,289,112 B1 | 9/2001 | Jain et al. | |
| 6,299,308 B1 | 10/2001 | Voronka et al. | |
| 6,308,565 B1 | 10/2001 | French et al. | |
| 6,316,934 B1 | 11/2001 | Amorai-Moriya et al. | |
| 6,363,160 B1 | 3/2002 | Bradski et al. | |
| 6,384,819 B1 | 5/2002 | Hunter | |
| 6,411,744 B1 | 6/2002 | Edwards | |
| 6,430,997 B1 | 8/2002 | French et al. | |
| 6,476,834 B1 | 11/2002 | Doval et al. | |
| 6,496,598 B1 | 12/2002 | Harman | |
| 6,503,195 B1 | 1/2003 | Keller et al. | |
| 6,539,931 B2 | 4/2003 | Trajkovic et al. | |
| 6,570,555 B1 | 5/2003 | Prevost et al. | |
| 6,633,294 B1 | 10/2003 | Rosenthal et al. | |
| 6,640,202 B1 | 10/2003 | Dietz et al. | |
| 6,661,918 B1 | 12/2003 | Gordon et al. | |
| 6,681,031 B2 | 1/2004 | Cohen et al. | |
| 6,714,665 B1 | 3/2004 | Hanna et al. | |
| 6,731,799 B1 | 5/2004 | Sun et al. | |
| 6,738,066 B1 | 5/2004 | Nguyen | |
| 6,765,726 B2 | 7/2004 | French et al. | |
| 6,778,171 B1 | 8/2004 | Kikinis | |
| 6,788,809 B1 | 9/2004 | Grzeszczuk et al. | |
| 6,801,637 B2 | 10/2004 | Voronka et al. | |
| 6,873,723 B1 | 3/2005 | Aucsmith et al. | |
| 6,876,496 B2 | 4/2005 | French et al. | |
| 6,937,742 B2 | 8/2005 | Roberts et al. | |
| 6,950,534 B2 | 9/2005 | Cohen et al. | |
| 6,993,727 B2 * | 1/2006 | De Ceulaer et al. | 715/843 |
| 7,003,134 B1 | 2/2006 | Covell et al. | |
| 7,036,094 B1 | 4/2006 | Cohen et al. | |
| 7,038,855 B2 | 5/2006 | French et al. | |
| 7,039,676 B1 | 5/2006 | Day et al. | |
| 7,042,440 B2 * | 5/2006 | Pryor et al. | 345/158 |
| 7,050,606 B2 | 5/2006 | Paul et al. | |
| 7,058,204 B2 * | 6/2006 | Hildreth et al. | 382/103 |
| 7,060,957 B2 | 6/2006 | Lange et al. | |
| 7,113,918 B1 | 9/2006 | Ahmad et al. | |
| 7,121,946 B2 | 10/2006 | Paul et al. | |
| 7,170,492 B2 | 1/2007 | Bell | |
| 7,184,048 B2 | 2/2007 | Hunter | |
| 7,202,898 B1 | 4/2007 | Braun et al. | |
| 7,222,078 B2 | 5/2007 | Abelow | |
| 7,227,526 B2 | 6/2007 | Hildreth et al. | |
| 7,259,747 B2 | 8/2007 | Bell | |
| 7,308,112 B2 | 12/2007 | Fujimura et al. | |
| 7,317,836 B2 | 1/2008 | Fujimura et al. | |
| 7,348,963 B2 | 3/2008 | Bell | |
| 7,359,121 B2 | 4/2008 | French et al. | |
| 7,367,887 B2 | 5/2008 | Watabe et al. | |
| 7,379,563 B2 | 5/2008 | Shamaie | |
| 7,379,566 B2 | 5/2008 | Hildreth | |
| 7,389,591 B2 | 6/2008 | Jaiswal et al. | |
| 7,412,077 B2 | 8/2008 | Li et al. | |
| 7,421,093 B2 | 9/2008 | Hildreth et al. | |
| 7,430,312 B2 | 9/2008 | Gu | |
| 7,436,496 B2 | 10/2008 | Kawahito | |
| 7,450,736 B2 | 11/2008 | Yang et al. | |
| 7,452,275 B2 | 11/2008 | Kuraishi | |
| 7,460,690 B2 | 12/2008 | Cohen et al. | |
| 7,489,812 B2 | 2/2009 | Fox et al. | |
| 7,536,032 B2 | 5/2009 | Bell | |
| 7,555,142 B2 | 6/2009 | Hildreth et al. | |
| 7,560,701 B2 | 7/2009 | Oggier et al. | |
| 7,570,805 B2 | 8/2009 | Gu | |
| 7,574,020 B2 | 8/2009 | Shamaie | |
| 7,576,727 B2 | 8/2009 | Bell | |
| 7,590,262 B2 | 9/2009 | Fujimura et al. | |
| 7,593,552 B2 | 9/2009 | Higaki et al. | |
| 7,598,942 B2 * | 10/2009 | Underkoffler et al. | 345/158 |
| 7,607,509 B2 | 10/2009 | Schmiz et al. | |
| 7,620,202 B2 | 11/2009 | Fujimura et al. | |
| 7,668,340 B2 | 2/2010 | Cohen et al. | |
| 7,680,298 B2 | 3/2010 | Roberts et al. | |
| 7,683,954 B2 | 3/2010 | Ichikawa et al. | |
| 7,684,592 B2 | 3/2010 | Paul et al. | |
| 7,701,439 B2 | 4/2010 | Hillis et al. | |
| 7,702,130 B2 | 4/2010 | Im et al. | |
| 7,704,135 B2 | 4/2010 | Harrison, Jr. | |
| 7,710,391 B2 | 5/2010 | Bell et al. | |
| 7,729,530 B2 | 6/2010 | Antonov et al. | |
| 7,746,345 B2 | 6/2010 | Hunter | |
| 7,760,182 B2 | 7/2010 | Ahmad et al. | |
| 7,809,167 B2 | 10/2010 | Bell | |
| 7,834,846 B1 | 11/2010 | Bell | |

| | | | |
|---|---|---|---|
| 7,852,262 | B2 | 12/2010 | Namineni et al. |
| RE42,256 | E | 3/2011 | Edwards |
| 7,898,522 | B2* | 3/2011 | Hildreth et al. ............ 345/156 |
| 8,035,612 | B2 | 10/2011 | Bell et al. |
| 8,035,614 | B2 | 10/2011 | Bell et al. |
| 8,035,624 | B2 | 10/2011 | Bell et al. |
| 8,072,470 | B2* | 12/2011 | Marks ......................... 345/632 |
| 2003/0193505 | A1* | 10/2003 | Ribadeau Dumas et al. . 345/473 |
| 2007/0242066 | A1* | 10/2007 | Levy Rosenthal ............ 345/419 |
| 2008/0026838 | A1 | 1/2008 | Dunstan et al. |
| 2010/0097332 | A1* | 4/2010 | Arthur et al. ................. 345/173 |
| 2011/0069019 | A1* | 3/2011 | Carpendale et al. .......... 345/173 |
| 2011/0093778 | A1* | 4/2011 | Kim et al. ..................... 715/702 |
| 2011/0304632 | A1* | 12/2011 | Evertt et al. .................. 345/474 |
| 2012/0154400 | A1* | 6/2012 | Steen .......................... 345/424 |
| 2012/0223882 | A1* | 9/2012 | Galor et al. ................... 345/157 |

FOREIGN PATENT DOCUMENTS

| | | |
|---|---|---|
| JP | 08044490 A1 | 2/1996 |
| WO | 93/10708 A1 | 6/1993 |
| WO | 97/17598 A1 | 5/1997 |
| WO | 99/44698 A1 | 9/1999 |

OTHER PUBLICATIONS

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Nonrigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collusion of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

Fohrenbach, Stephanie, "Hand Gesture Interaction for Large High-Resolution Displays Design and Evaluation", Retrieved at << http://hci.uni-konstanz.de/downloads/HandGestureInteraction_MA_Foehrenbach.pdf >>, Feb. 2009, pp. 138.

Zhai, et al., "Manual and Gaze Input Cascaded (MAGIC) Pointing", Retrieved at << http://www.almaden.ibm.com/u/zhai/papers/magic/magic.pdf >>, ACM Conference on Human Factors in Computing Systems, May 15-20, 1999, pp. 8.

Liao, et al., "Characterizing the Effects of Droplines on Target Acquisition Performance on a 3-D Perspective Display", Retrieved at << http://www.questia.com/googleScholar.qst?docId=5008899411 >>, Human Factors, vol. 46, 2004, pp. 2.

Fellner, et al., "Harnessing the human visual system for image based modeling: an interaction system", Retrieved at << http://www.scss.tcd.ie/~ymorvan/paper1012.pdf >>, The Eurographics Association, 2006, pp. 4.

Kumar, et al., "Black Pearl: An Alternative for Mouse and Keyboard", Retrieved at << http://www.icgst.com/gvip/volume8/issue3/P1150824001.pdf >>, vol. 8, No. III, Oct. 2008, p. 1-6.

Parrish, Kevin, "Microsoft Does Want Core Games, FPS for Kinect", Retrieved at << http://www.tomsguide.com/us/Core-Gamers-Kinect-FPS-Action,news-7195.html >>, Jun. 23, 2010, pp. 5.

Crawford, Stephanie, "How Microsoft Kinect Works", Retrieved at << http://electronics.howstuffworks.com/microsoft-kinect.htm/printable >>, Retrieved Date : Dec. 21, 2010, pp. 4.

Fitzqibbon, et al., "Human Body Pose Estimation", U.S. Appl. No. 12/454,628, filed May 20, 2009, pp. 27.

* cited by examiner

PUSH ACTUATION OF INTERFACE CONTROLS

BACKGROUND

Computer technology enables humans to interact with computers in various ways. One such interaction may occur when humans use various input devices such as mice, track pads, and game controllers to actuate buttons on a user interface of a computing device.

SUMMARY

The three-dimensional position of a user's hand in world space can be translated to a screen space cursor position of a user interface. As the user moves the hand in world space, the cursor moves about in the user interface. A button of the user interface may be actuated when the hand moves the cursor so that a depth of the cursor changes by at least a threshold amount while the cursor overlaps the button, regardless of the initial depth of the cursor within the user interface.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

A depth-image analysis system, such as a 3D-vision computing system, may include a depth camera capable of observing one or more game players or other computer users. As the depth camera captures images of a game player or other computer user within an observed scene, those images may be interpreted and modeled with one or more virtual skeletons. Various aspects of the modeled skeletons may serve as input commands to a user interface. For example, a computing system may be able to determine if the player is trying to press a button of the user interface based on the movement of the player's modeled hand.

Figure 1:
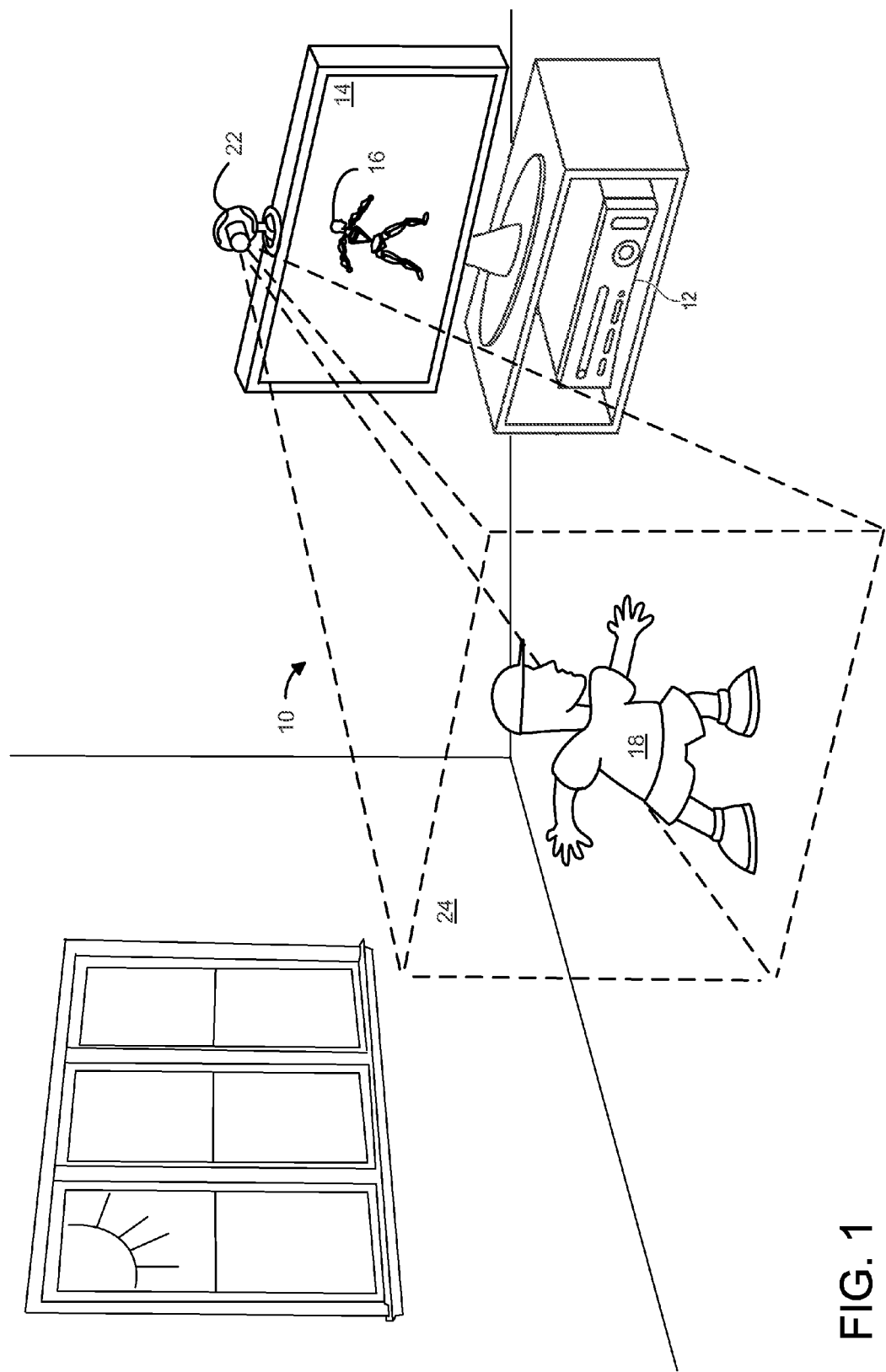
FIG. 1 shows a depth-image analysis system viewing an observed scene in accordance with an embodiment of the present disclosure.

FIG. 1 shows a non-limiting example of a depth-image analysis system 10. In particular, FIG. 1 shows a gaming system 12 that may be used to play a variety of different games, play one or more different media types, and/or control or manipulate non-game applications and/or operating systems. FIG. 1 also shows a display device 14 such as a television or a computer monitor, which may be used to present game visuals to game players. As one example, display device 14 may be used to visually present a virtual avatar 16 that human target 18 controls with his movements. The depth-image analysis system 10 may include a capture device, such as a depth camera 22 that visually monitors or tracks human target 18 within an observed scene 24. Depth camera 22 is discussed in greater detail with respect to FIG. 7.

Human target 18 is shown here as a game player within observed scene 24. Human target 18 is tracked by depth camera 22 so that the movements of human target 18 may be interpreted by gaming system 12 as controls that can be used to affect the game being executed by gaming system 12. In other words, human target 18 may use his or her movements to control the game. The movements of human target 18 may be interpreted as virtually any type of game control. Some movements of human target 18 may be interpreted as controls that serve purposes other than controlling virtual avatar 16. As a nonlimiting example, movements of human target 18 may be interpreted as user interface controls, such as controls for pressing a virtual button of a virtual user interface displayed by display device 14.

Depth camera 22 may also be used to interpret target movements as operating system and/or application controls that are outside the realm of gaming. Virtually any controllable aspect of an operating system and/or application may be controlled by movements of a human target 18. The illustrated scenario in FIG. 1 is provided as an example, but is not meant to be limiting in any way. To the contrary, the illustrated scenario is intended to demonstrate a general concept, which may be applied to a variety of different applications without departing from the scope of this disclosure.

The methods and processes described herein may be tied to a variety of different types of computing systems. FIG. 1 shows a non-limiting example in the form of gaming system 12, display device 14, and depth camera 22. In general, a depth-image analysis system may include a computing system 160, shown in simplified form in FIG. 7, which will be discussed in greater detail below.

Figure 2:
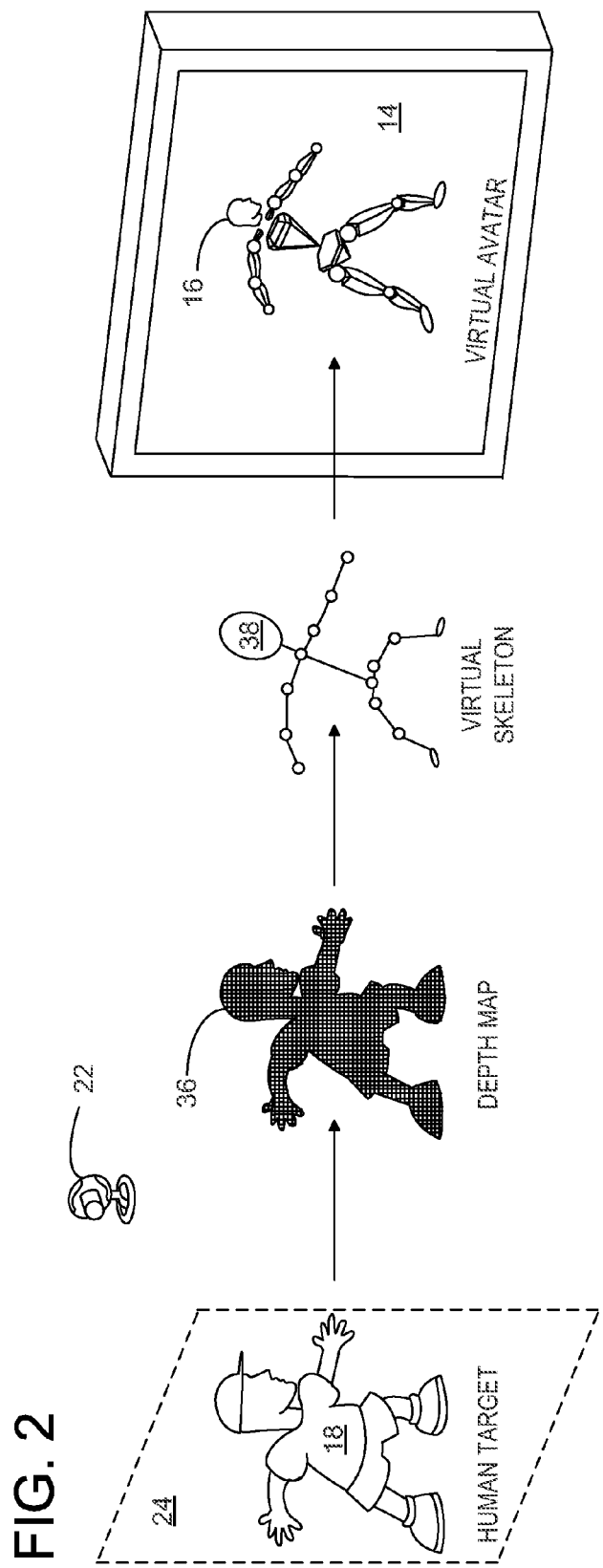
FIG. 2 somewhat schematically shows a human target in an observed scene being modeled with example skeletal data.

FIG. 2 shows a simplified processing pipeline in which human target 18 in an observed scene 24 is modeled as a virtual skeleton 38 that can be used to draw a virtual avatar 16 on display device 14 and/or serve as a control input for controlling other aspects of a game, application, and/or operating system. It will be appreciated that a processing pipeline may include additional steps and/or alternative steps than those depicted in FIG. 2 without departing from the scope of this disclosure.

As shown in FIG. 2, human target 18 and the rest of observed scene 24 may be imaged by a capture device such as depth camera 22. The depth camera may determine, for each pixel, the depth of a surface in the observed scene relative to the depth camera. Virtually any depth finding technology may be used without departing from the scope of this disclosure. Example depth finding technologies are discussed in more detail with reference to FIG. 7.

The depth information determined for each pixel may be used to generate a depth map 36. Such a depth map may take the form of virtually any suitable data structure, including but not limited to a matrix that includes a depth value for each pixel of the observed scene. In FIG. 2, depth map 36 is schematically illustrated as a pixelated grid of the silhouette of human target 18. This illustration is for simplicity of understanding, not technical accuracy. It is to be understood that a depth map generally includes depth information for all pixels, not just pixels that image the human target 18, and that the perspective of depth camera 22 would not result in the silhouette depicted in FIG. 2.

Virtual skeleton 38 may be derived from depth map 36 to provide a machine readable representation of human target 18. In other words, virtual skeleton 38 is derived from depth map 36 to model human target 18. The virtual skeleton 38 may be derived from the depth map in any suitable manner. In some embodiments, one or more skeletal fitting algorithms may be applied to the depth map. The present disclosure is compatible with virtually any skeletal modeling techniques.

The virtual skeleton 38 may include a plurality of joints, each joint corresponding to a portion of the human target. In FIG. 2, virtual skeleton 38 is illustrated as a fifteen-joint stick figure. This illustration is for simplicity of understanding, not technical accuracy. Virtual skeletons in accordance with the present disclosure may include virtually any number of joints, each of which can be associated with virtually any number of parameters (e.g., three dimensional joint position, joint rotation, body posture of corresponding body part (e.g., hand open, hand closed, etc.) etc.). It is to be understood that a virtual skeleton may take the form of a data structure including one or more parameters for each of a plurality of skeletal joints (e.g., a joint matrix including an x position, a y position, a z position, and a rotation for each joint). In some embodiments, other types of virtual skeletons may be used (e.g., a wireframe, a set of shape primitives, etc.).

As shown in FIG. 2, a virtual avatar 16 may be rendered on display device 14 as a visual representation of virtual skeleton 38. Because virtual skeleton 38 models human target 18, and the rendering of the virtual avatar 16 is based on the virtual skeleton 38, the virtual avatar 16 serves as a viewable digital representation of the human target 18. As such, movement of virtual avatar 16 on display device 14 reflects the movements of human target 18.

In some embodiments, only portions of a virtual avatar will be presented on display device 14. As one non-limiting example, display device 14 may present a first person perspective to human target 18 and may therefore present the portions of the virtual avatar that could be viewed through the virtual eyes of the virtual avatar (e.g., outstretched hands holding a steering wheel, outstretched arms holding a rifle, outstretched hands grabbing a virtual object in a three-dimensional virtual world, etc.).

While virtual avatar 16 is used as an example aspect of a game that may be controlled by the movements of a human target via the skeletal modeling of a depth map, this is not intended to be limiting. A human target may be modeled with a virtual skeleton, and the virtual skeleton can be used to control aspects of a game or other application other than a virtual avatar. For example, the movement of a human target can control a game or other application even if a virtual avatar is not rendered to the display device.

Figure 3:
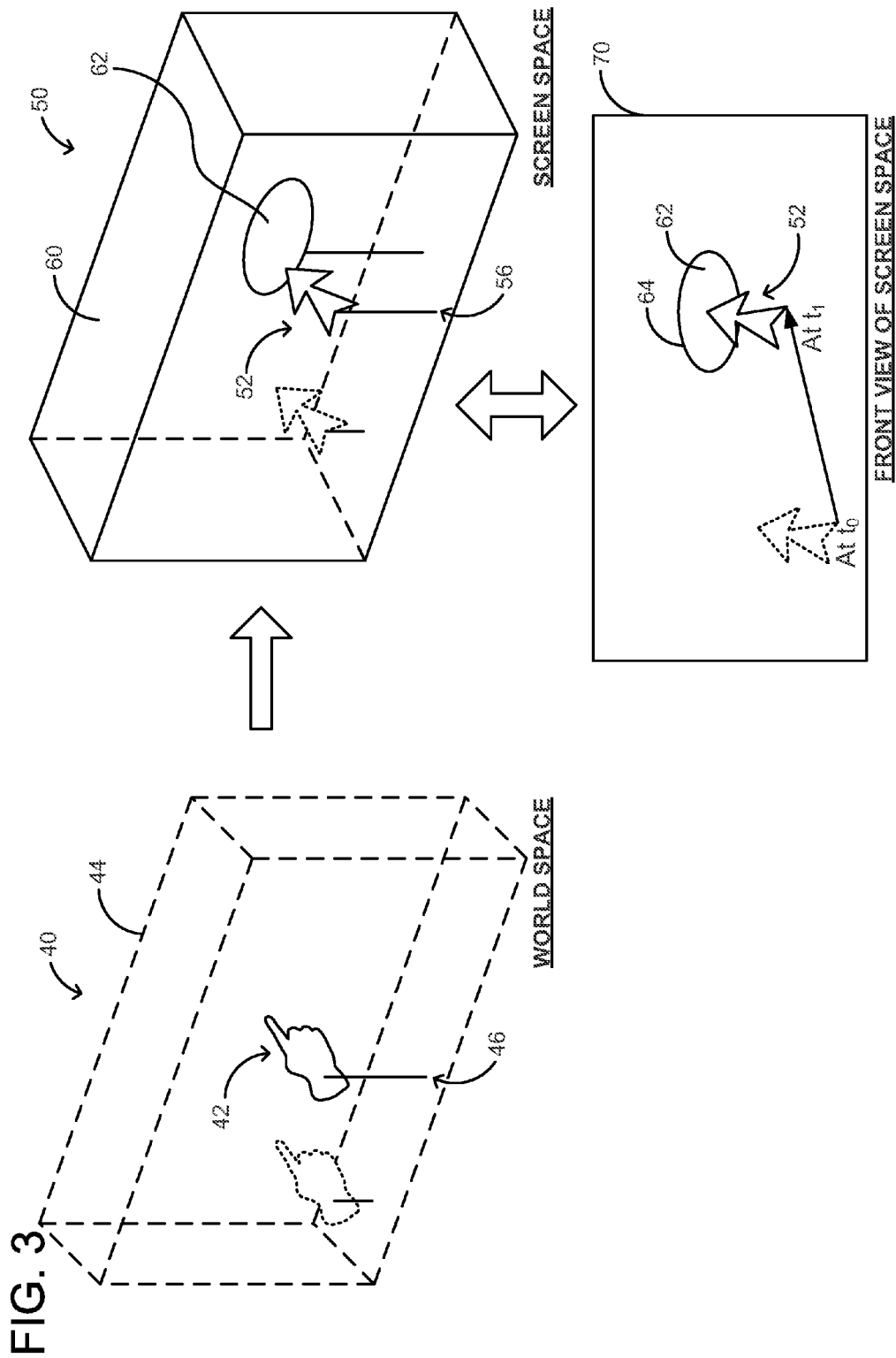
FIG. 3 shows an example of a hand movement in world space that causes a corresponding screen space cursor movement.

Instead of displaying an avatar of the human target, a cursor may be displayed. FIG. 3 illustrates an example in which a position of a hand 42 in world space 40 is used to control a position of a cursor 52 in a screen space 50. A movement of the hand of the human target may be tracked based on one or more depth images of a world space scene including the human target.

The movement of hand 42 in world space 40 may be tracked, over time, in an interaction zone 44 that moves as the human target moves about in world space 40. A position and orientation of interaction zone 44 may be based on a position and orientation of the human target. As a non-limiting example, the position and orientation of the interaction zone 44 may be based on a relative position of a head of the human target. For example, a position and orientation of the interaction zone 44 may be adjusted as a position of the head of the human target changes. However, in alternate embodiments, the position and orientation of the interaction zone 44 may vary with the relative position of one or more alternate body parts of the human target, such as the chest or shoulders. Thus, as the human target moves about in world space (e.g., steps forward, steps backward, turns to the left, turns to the right), the interaction zone 44 is correspondingly realigned relative to the human target.

The movements of hand 42 in world space 40 that are tracked in interaction zone 44 may be translated to corresponding movements of a cursor 52 in screen space 50. That is, a world space position 46 of hand 42 may be translated to a screen space cursor position 56 of a user interface 60 displayed by a computing system. In the depicted example, a movement of the hand 42 from an initial hand position at $t_0$ (depicted as a hand in dotted lines) to a final hand position at $t_1$ (depicted as a hand in solid lines) causes a corresponding movement of the cursor 52 from an initial cursor position (depicted as a cursor in dotted lines) to a final cursor position (depicted as a cursor in solid lines).

User interface 60 may include one or more control features that may be actuated or selected by predefined hand movements. These may include, for example, knobs, dials, buttons, menus, etc. In the depicted example, the user interface 60 includes a button 62 that may be actuated by hand movements that occur while the cursor 52 is overlapping the button 62 in the screen space 50.

A front view of the cursor movement is depicted at 70. This view shows movements in an x-y plane of the screen space but not in the z-plane of the screen space. In the depicted example, the hand movement causes the cursor to move to a final cursor position wherein the cursor 52 overlaps the button 62.

At any given time, the cursor's position may be defined by x-y-z coordinates, wherein the x-coordinate indicates the lateral position of the cursor, the y-coordinate indicates the vertical position of the cursor, and the z-coordinate indicates the depth of the cursor. Button 62 may have an activation perimeter 64 in an x-y plane of the screen space. The activation perimeter 64 may or may not correspond to a display perimeter of the button. The cursor 52 is considered to be overlapping the button 62 if an x-y coordinate of the cursor 52 is within the activation perimeter 64 of the button 62, irrespective of the z-axis coordinate of the cursor relative to the button.

In one example, where the cursor 52 is defined by an irregular shape, at least one x-y coordinate of the cursor 52 may be required to overlap the activation perimeter 64 of the button 62. The cursor 52 may be at a different depth of the screen space 50 as compared to the button (e.g., in front of, or beyond the button), however, as long as the x-y coordinates of the cursor 52 overlap the activation perimeter 64 of the button 62, the cursor 52 may actuate the button 62.

Figure 4:
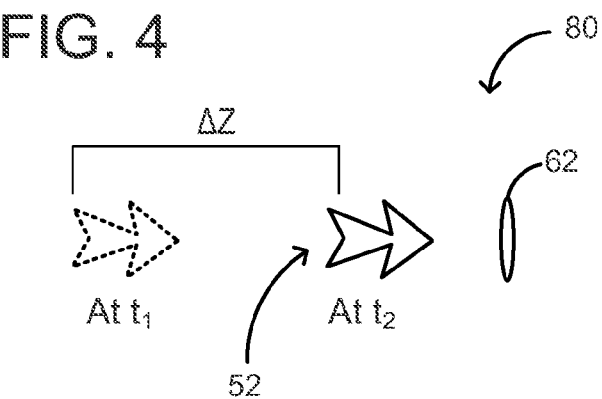
FIG. 4 shows an example cursor movement actuating a button of the user interface.

FIG. 4 shows an example cursor movement that causes button actuation. Specifically, a side view 80 of such a cursor movement is depicted. As such, this view 80 shows movements in the y-z-plane of the screen space but not in the x plane of the screen space. At $t_1$, the cursor 52 is at an initial cursor position (depicted as a cursor in dotted lines) wherein the cursor 52 overlaps the button 62. At $t_2$, hand movement in world space moves the cursor 52 to a subsequent cursor position (depicted as a cursor in solid lines). The button 62 is actuated responsive to a movement of the hand in world space that changes the cursor position by at least a depth threshold ($\Delta Z$) along the z-axis, regardless of the initial z-axis position of the cursor 52. In other words, the hand movement in world space "pushes" the cursor by at least the depth threshold (ΔZ), thus actuating button 62.

In one example, the depth (i.e., z-coordinate) of the cursor may be sampled when it first overlaps the button. This depth may be used as a reference (i.e. a zero push value) for determining if a push movement has occurred. That is, a change in the z-coordinate of the cursor 52 is measured from this reference value. The depth change may be calculated as a distance travelled along the z-axis, for example.

The button 62 may be actuated responsive to a relative change in the z-coordinates of the cursor 52, irrespective of the absolute z-coordinates of the cursor 52 at the initial and final positions. Thus, the button 62 may be actuated even if the cursor 52 doesn't reach the depth of the button 62. In other words, the button 62 is actuated irrespective of whether the cursor 52 is moved, or "pushed", from an initial position in front of the button to a final position in front of the button, an initial position beyond the button to a final position beyond the button, or an initial position in front of the button to a final position beyond the button.

Figure 5:
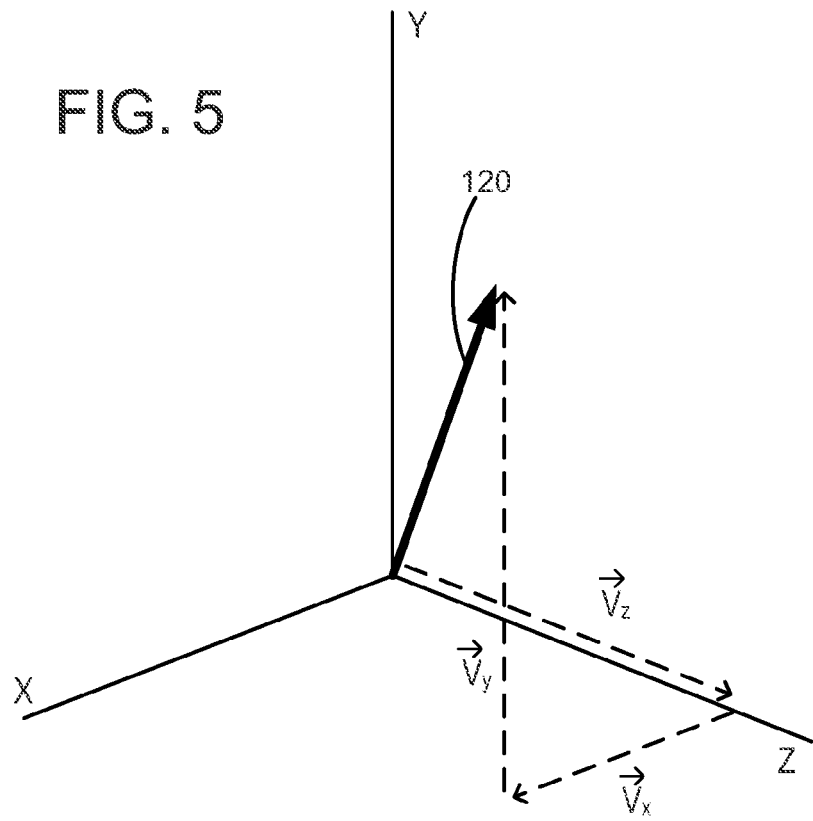
FIG. 5 shows a cursor velocity vector for an example cursor movement.

As shown in FIG. 5, the cursor may have a cursor velocity 120 that can be characterized by normalized vector components along x-y-z axes ($V_x$, $V_y$, and $V_z$, respectively). The depth threshold for button actuation may be set based on the absolute cursor velocity, the absolute cursor velocity along a particular axis, and/or the normalized cursor velocity along a particular axis (i.e., the velocity in one axis relative to one or more other axes). In other words, the velocity of a push movement may determine how far the cursor has to be pushed for the button to be actuated. As an example, the depth threshold may be decreased as a z-axis component of the cursor velocity increases. Likewise, the depth threshold may be increased as a z-axis component of the cursor velocity decreases. In other words, to actuate the button, the cursor may be pushed by a smaller distance when the hand is moving quickly, while the cursor may be pushed by a larger distance when the hand is moving slowly. This allows both short, sharp "taps" as well as long slow pushes to actuate the button.

As another example, the depth threshold may be decreased as a normalized z-axis component of the cursor velocity increases. Likewise, the depth threshold may be increased as a normalized z-axis component of the cursor velocity decreases. In other words, it may require less overall pushing to actuate the button when cursor movement is more directly in the z direction compared to when cursor movement is less directly in the z direction.

In some embodiments, when the cursor overlaps the button in the user interface, the button may be actuated responsive to a movement of the hand in world space that moves the cursor position with a velocity having a normalized z-axis component that is equal to or greater than a z-axis velocity threshold. The actuation may be based on the normalized z-axis component, rather than the absolute z-axis velocity. This allows any hand movement that causes a deliberate movement of the cursor into the screen space, irrespective of the speed with which the cursor is moved into the screen space, to be considered an actuating "push" movement.

Figure 6:
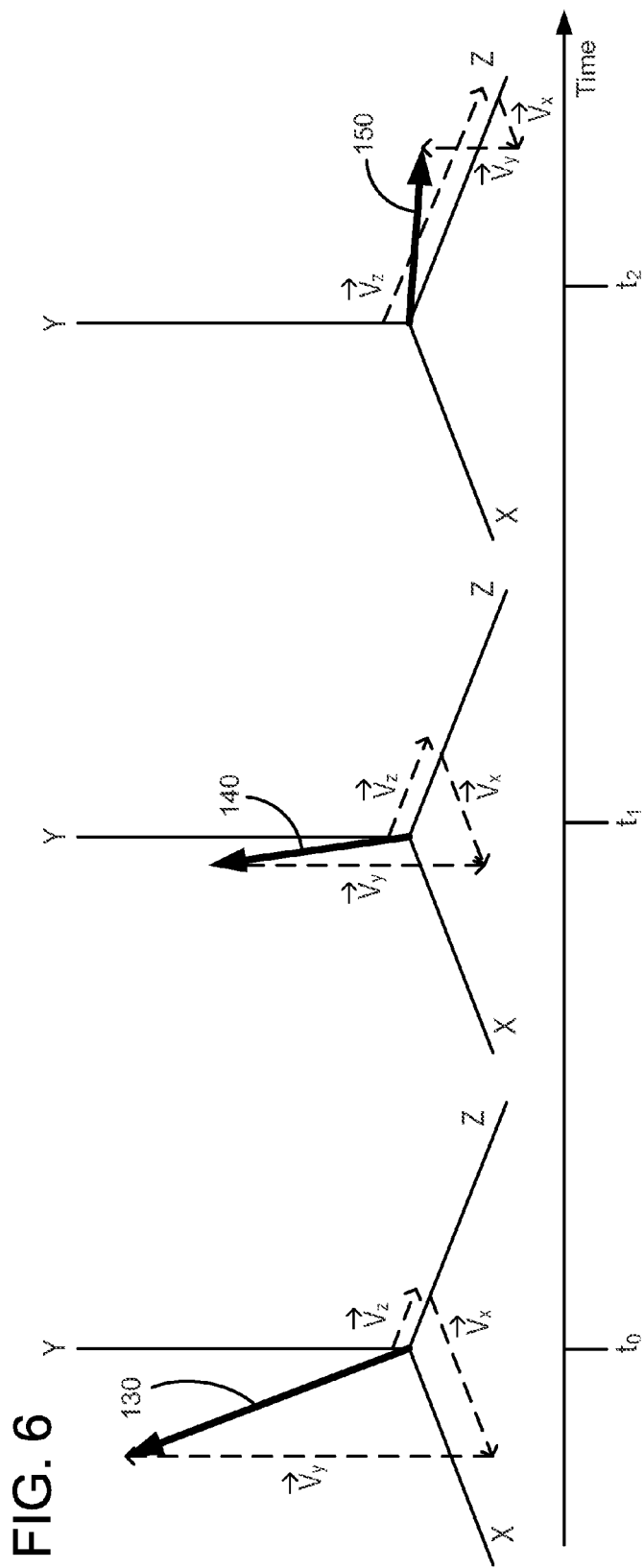
FIG. 6 shows an example sequence of changes in a cursor velocity responsive to cursor movements.

A cursor velocity may be tracked at any given time over the duration of the cursor's movement. FIG. 6 shows an example of a cursor velocity being tracked over time ($t_0$ through $t_2$). Herein, sequential changes in the cursor velocity are represented by changes in the cursor velocity vector and its normalized x, y, and z-axis components over the duration of cursor movement. At $t_0$, the cursor has a cursor velocity 130 with large normalized x-axis and normalized y-axis components but a smaller normalized z-axis component. That is, the cursor may be moving faster, and/or in a more pronounced manner, in the x-y plane of the screen space as compared to the z direction of the screen space. In other words, the cursor is moving faster across the screen surface than into (or out of) the screen surface.

Between $t_0$ and $t_1$, the movement of the cursor decreases across the x-y plane while increasing by a small amount along the z-axis. That is, the cursor movement across the screen surface slows. This gives rise to a cursor velocity vector 140 at $t_1$ that has a smaller normalized x-axis and normalized y-axis component and a relatively larger normalized z-axis component (as compared to the normalized components at to).

Between $t_1$ and $t_2$, the cursor movement may undergo a sudden path change. In the depicted example, the cursor's movement across the screen slows rapidly, while the cursor's movement into the screen rapidly increases. This gives rise to a cursor velocity vector 150 at $t_2$ that has an even smaller normalized x-axis and normalized y-axis component and a substantially larger normalized z-axis component (as compared to the normalized components at $t_0$ and $t_1$).

Such cursor velocities may be considered with one or more other parameters to infer whether a user intends to push a button. For example, the cursor velocities before and after a cursor overlaps a button may be analyzed to infer whether a user intends to push a button.

In some embodiments, a button may have an activation lock configured to reduce false positives that may occur when a user does not intend to press the button. Such, an activation lock may be unlocked only if the cursor path (i.e., sequence of cursor velocities) satisfies an unlocking criteria. As such, the button may have to be unlocked before a pushing action can be recognized and the button can be actuated.

As one example, the unlocking criteria may include an x-y velocity of the cursor decreasing by a slowdown threshold when the cursor approaches the button. In other words, the activation lock of the button may be unlocked in response to a significant decrease in the cursor velocity across the screen. The decrease in cursor velocity in the x-y plane may be read when the cursor is within a threshold distance of the button. In this way, the slowing down of cursor movement across the screen, when the cursor is in the vicinity of a button, is effectively read as a user's intent to select, and possibly press, the button.

An example of such a cursor movement that may unlock the button's activation lock is depicted in FIG. 6 at $t_1$. The cursor may be closer to the button at $t_1$ as compared to at $t_0$. The cursor is moved more slowly as it approaches the button. The decrease in the cursor velocity's normalized x- and y-axis components at $t_1$ is read as the user's intent to select the button, and consequently, the activation lock is unlocked. After the activation lock is unlocked at $t_1$, the button may then be actuated at time $t_2$.

As another example, the unlocking criteria may include an increase in the normalized z-axis component when the cursor is within a threshold x-y distance of the button. In other words, the activation lock of the button may be unlocked in response to a significant increase in the cursor velocity into the screen. In this way, the quickening of cursor movement into the screen, when the cursor is in the vicinity of a button, is effectively read as a user's intent to press the button.

If the activation lock is unlocked, the button may then be actuated responsive to a movement of the hand in world space that moves the cursor position with a velocity having a normalized z-axis component that is equal to or greater than a z-axis velocity threshold.

In some embodiments, the above described methods and processes may be tied to a computing system including one or more computers. In particular, the methods and processes described herein may be implemented as a computer application, computer service, computer API, computer library, and/or other computer program product.

Figure 7:
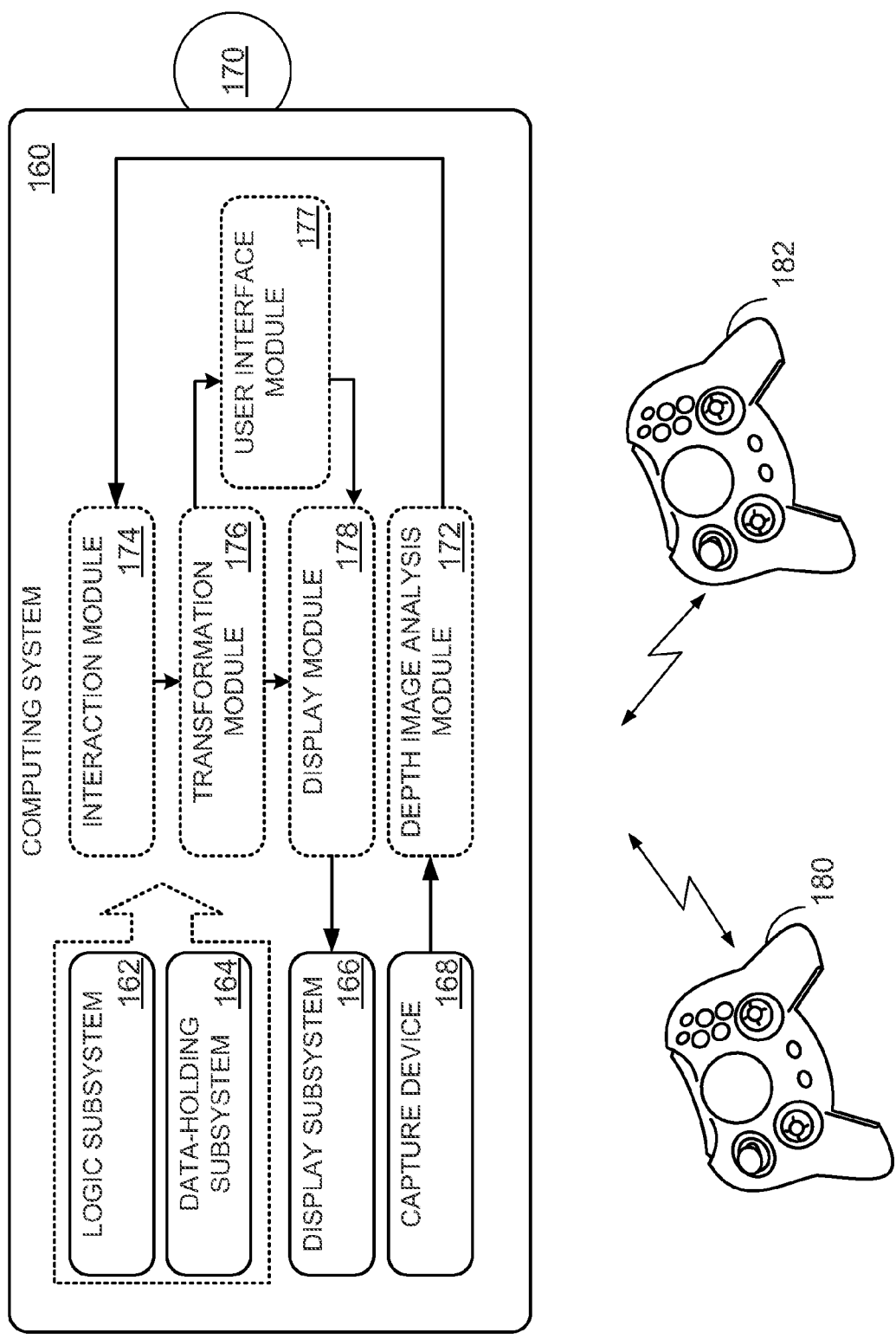
FIG. 7 schematically shows a computing system in accordance with an embodiment of the present disclosure.

FIG. 7 schematically shows a non-limiting computing system 160 that may perform one or more of the above described methods and processes. Computing system 160 is shown in simplified form. It is to be understood that virtually any computer architecture may be used without departing from the scope of this disclosure. In different embodiments, computing system 160 may take the form of a mainframe computer, server computer, desktop computer, laptop computer, tablet computer, home entertainment computer, network computing device, mobile computing device, mobile communication device, gaming device, etc.

Computing system 160 may include a logic subsystem 162, a data-holding subsystem 164, a display subsystem 166, and/or a capture device 168. The computing system may optionally include components not shown in FIG. 7, and/or some components shown in FIG. 7 may be peripheral components that are not integrated into the computing system.

Logic subsystem 162 may include one or more physical devices configured to execute one or more instructions. For example, the logic subsystem may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem may include one or more processors that are configured to execute software instructions. Additionally or alternatively, the logic subsystem may include one or more hardware or firmware logic machines configured to execute hardware or firmware instructions. Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Data-holding subsystem 164 may include one or more physical, non-transitory, devices configured to hold data and/or instructions executable by the logic subsystem to implement the herein described methods and processes. When such methods and processes are implemented, the state of data-holding subsystem 164 may be transformed (e.g., to hold different data).

Data-holding subsystem 164 may include removable media and/or built-in devices. Data-holding subsystem 164 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Data-holding subsystem 164 may include devices with one or more of the following characteristics: volatile, nonvolatile, dynamic, static, read/write, read-only, random access, sequential access, location addressable, file addressable, and content addressable. In some embodiments, logic subsystem 162 and data-holding subsystem 164 may be integrated into one or more common devices, such as an application specific integrated circuit or a system on a chip.

FIG. 7 also shows an aspect of the data-holding subsystem in the form of removable computer-readable storage media 170, which may be used to store and/or transfer data and/or instructions executable to implement the herein described methods and processes. Removable computer-readable storage media 170 may take the form of CDs, DVDs, HD-DVDs, Blu-Ray Discs, EEPROMs, and/or floppy disks, among others.

It is to be appreciated that data-holding subsystem 164 includes one or more physical, non-transitory devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal.

The term "module" may be used to describe an aspect of computing system 160 that is implemented to perform one or more particular functions. In some cases, such a module may be instantiated via logic subsystem 162 executing instructions held by data-holding subsystem 164. It is to be understood that different modules and/or engines may be instantiated from the same application, code block, object, routine, and/or function. Likewise, the same module and/or engine may be instantiated by different applications, code blocks, objects, routines, and/or functions in some cases.

Computing system 160 includes a depth image analysis module 172 configured to track a world-space pose of a human in a fixed, world-space coordinate system, as described herein. The term "pose" refers to the human's position, orientation, body arrangement, etc. Computing system 160 includes an interaction module 174 configured to establish a virtual interaction zone with a moveable, interface-space coordinate system that tracks the human and moves relative to the fixed, world-space coordinate system, as described herein. Computing system 160 includes a transformation module 176 configured to transform a position defined in the fixed, world-space coordinate system to a position defined in the moveable, interface-space coordinate system as described herein. Computing system 160 also includes a display module 178 configured to output a display signal for displaying an interface element at a desktop-space coordinate corresponding to the position defined in the moveable, interface-space coordinate system.

Computing system 160 includes a user interface module 177 configured to translate cursor movements in a user interface to actions involving the interface elements. As a nonlimiting example, user interface module 177 may analyze cursor movements relative to buttons of the user interface to determine when such buttons are to be unlocked and/or actuated.

Display subsystem 166 may be used to present a visual representation of data held by data-holding subsystem 164. As the herein described methods and processes change the data held by the data-holding subsystem, and thus transform the state of the data-holding subsystem, the state of display subsystem 166 may likewise be transformed to visually represent changes in the underlying data. As a nonlimiting example, the target recognition, tracking, and analysis described herein may be reflected via display subsystem 166 in the form of interface elements (e.g., cursors) that change position in a virtual desktop responsive to the movements of a user in physical space. Display subsystem 166 may include one or more display devices utilizing virtually any type of technology. Such display devices may be combined with logic subsystem 162 and/or data-holding subsystem 164 in a shared enclosure, or such display devices may be peripheral display devices, as shown in FIG. 1.

Computing system 160 further includes a capture device 168 configured to obtain depth images of one or more targets. Capture device 168 may be configured to capture video with depth information via any suitable technique (e.g., time-of-flight, structured light, stereo image, etc.). As such, capture device 168 may include a depth camera (such as depth camera 22 of FIG. 1), a video camera, stereo cameras, and/or other suitable capture devices.

For example, in time-of-flight analysis, the capture device 168 may emit infrared light to the target and may then use sensors to detect the backscattered light from the surface of the target. In some cases, pulsed infrared light may be used, wherein the time between an outgoing light pulse and a corresponding incoming light pulse may be measured and used to determine a physical distance from the capture device to a particular location on the target. In some cases, the phase of the outgoing light wave may be compared to the phase of the incoming light wave to determine a phase shift, and the phase shift may be used to determine a physical distance from the capture device to a particular location on the target.

In another example, time-of-flight analysis may be used to indirectly determine a physical distance from the capture device to a particular location on the target by analyzing the intensity of the reflected beam of light over time via a technique such as shuttered light pulse imaging.

In another example, structured light analysis may be utilized by capture device 168 to capture depth information. In such an analysis, patterned light (i.e., light displayed as a known pattern such as a grid pattern or a stripe pattern) may be projected onto the target. On the surface of the target, the pattern may become deformed, and this deformation of the pattern may be studied to determine a physical distance from the capture device to a particular location on the target.

In another example, the capture device may include two or more physically separated cameras that view a target from different angles, to obtain visual stereo data. In such cases, the visual stereo data may be resolved to generate a depth image.

In other embodiments, capture device 168 may utilize other technologies to measure and/or calculate depth values. Additionally, capture device 168 may organize the calculated depth information into "Z layers," i.e., layers perpendicular to a Z axis extending from the depth camera along its line of sight to the viewer.

In some embodiments, two or more different cameras may be incorporated into an integrated capture device. For example, a depth camera and a video camera (e.g., RGB video camera) may be incorporated into a common capture device. In some embodiments, two or more separate capture devices may be cooperatively used. For example, a depth camera and a separate video camera may be used. When a video camera is used, it may be used to provide target tracking data, confirmation data for error correction of target tracking, image capture, face recognition, high-precision tracking of fingers (or other small features), light sensing, and/or other functions.

It is to be understood that at least some target analysis and tracking operations may be executed by a logic machine of one or more capture devices. A capture device may include one or more onboard processing units configured to perform one or more target analysis and/or tracking functions. A capture device may include firmware to facilitate updating such onboard processing logic.

Computing system 160 may optionally include one or more input devices, such as controller 180 and controller 182.

Input devices may be used to control operation of the computing system. In the context of a game, input devices, such as controller 180 and/or controller 182 can be used to control aspects of a game not controlled via the target recognition, tracking, and analysis methods and procedures described herein. In some embodiments, input devices such as controller 180 and/or controller 182 may include one or more of accelerometers, gyroscopes, infrared target/sensor systems, etc., which may be used to measure movement of the controllers in physical space. In some embodiments, the computing system may optionally include and/or utilize input gloves, keyboards, mice, track pads, trackballs, touch screens, buttons, switches, dials, and/or other input devices. As will be appreciated, target recognition, tracking, and analysis may be used to control or augment aspects of a game, or other application, conventionally controlled by an input device, such as a game controller. In some embodiments, the target tracking described herein can be used as a complete replacement to other forms of user input, while in other embodiments such target tracking can be used to complement one or more other forms of user input.

The invention claimed is:

1. A computing system, comprising:
a peripheral input configured to receive depth images from a depth camera;
a display output configured to output a user interface to a display device, the user interface including a button;
a logic subsystem operatively connectable to the depth camera via the peripheral input and to the display device via the display output; and
a data holding subsystem holding instructions executable by the logic subsystem to:
receive from the depth camera one or more depth images of a world space scene including a human target;
translate a world space position of a hand of the human target to a screen space cursor position of the user interface such that movement of the hand in world space causes corresponding movement of a cursor in screen space; and
when the cursor overlaps the button in the user interface, actuate the button responsive to a movement of the hand in world space that changes the cursor position by a depth threshold along a z-axis regardless of an initial z-axis position of the cursor.

2. The computing system of claim 1, wherein the button has an activation perimeter in an x-y plane, and wherein the cursor overlaps the button if an x-y coordinate of the cursor is within the activation perimeter of the button.

3. The computing system of claim 1, wherein the cursor has a cursor velocity, and wherein the data holding subsystem holds instructions executable by the logic subsystem to adjust the depth threshold based on the cursor velocity.

4. The computing system of claim 3, wherein the depth threshold is decreased as a normalized z-axis component of the cursor velocity increases.

5. The computing system of claim 3, wherein the depth threshold is increased as a normalized z-axis component of the cursor velocity decreases.

6. The computing system of claim 1, wherein the movement of the hand in world space is tracked in an interaction zone that moves as the human target moves about in world space.

7. The computing system of claim 6, wherein a position and orientation of the interaction zone is based on a position and orientation of the human target.

8. The computing system of claim 7, wherein the position and orientation of the interaction zone is based on a relative position of a head of the human target.

9. A computing system, comprising:
a peripheral input configured to receive depth images from a depth camera;
a display output configured to output a user interface to a display device, the user interface including a button;
a logic subsystem operatively connectable to the depth camera via the peripheral input and to the display device via the display output; and
a data holding subsystem holding instructions executable by the logic subsystem to:
receive from the depth camera one or more depth images of a world space scene including a human target;
translate a world space position of a hand of the human target to a screen space cursor position of the user interface such that movement of the hand in world space causes corresponding movement of a cursor in screen space; and
when the cursor overlaps the button in the user interface, actuate the button responsive to a movement of the hand in world space that moves the cursor position with a velocity having a normalized z-axis component that is equal to or greater than a z-axis velocity threshold.

10. The computing system of claim 9, wherein the button has an activation perimeter in an x-y plane, and wherein the cursor overlaps the button if an x-y coordinate of the cursor is within the activation perimeter of the button.

11. The computing system of claim 9, wherein the movement of the hand in world space is tracked in an interaction zone that moves as the human target moves about in world space.

12. The computing system of claim 11, wherein a position and orientation of the interaction zone is based on a position and orientation of the human target.

13. The computing system of claim 12, wherein the position and orientation of the interaction zone is based on a relative position of a head of the human target.

14. A computing system, comprising:
a peripheral input configured to receive depth images from a depth camera;
a display output configured to output a user interface to a display device, the user interface including a button, the button having an activation lock;
a logic subsystem operatively connectable to the depth camera via the peripheral input and to the display device via the display output; and
a data holding subsystem holding instructions executable by the logic subsystem to:
receive from the depth camera one or more depth images of a world space scene including a human target;
translate a world space position of a hand of the human target to a screen space cursor position of the user interface such that movement of the hand in world space causes corresponding movement of a cursor in screen space;
unlock the activation lock of the button if a cursor path satisfies an unlocking criteria; and
when the cursor overlaps the button in the user interface, actuate the button responsive to a movement of the hand in world space that moves the cursor position with a velocity having a normalized z-axis component that is equal to or greater than a z-axis velocity threshold, if the activation lock is unlocked.

15. The computing system of claim 14, wherein the unlocking criteria includes an x-y velocity of the cursor decreasing by a slowdown threshold when the cursor approaches the button.

16. The computing system of claim 14, wherein the unlocking criteria includes an increase in the normalized z-axis component when the cursor is within a threshold x-y distance of the button.

17. The computing system of claim 14, wherein the data holding subsystem holds instructions executable by the logic subsystem to:
store an initial cursor velocity when the cursor first overlaps the button in the user interface;
store a final cursor velocity after a threshold duration since the cursor first overlaps the button in the user interface; and
calculate a normalized average z-axis component of the cursor velocity based on the initial cursor velocity and the final cursor velocity.

18. The computing system of claim 14, wherein the movement of the hand in world space is tracked in an interaction zone that moves as the human target moves about in world space.

19. The computing system of claim 18, wherein a position and orientation of the interaction zone is based on a position and orientation of the human target.

20. The computing system of claim 19, wherein the position and orientation of the interaction zone is based on a relative position of a head of the human target.

* * * * *